United States Patent
Caputo (10) Patent No.: US 10,713,740 B1
(45) Date of Patent: Jul. 14, 2020

(54) ELECTRONIC DEVICE FOR PROVIDING ACCESS TO PROPERTIES

(71) Applicant: ShowingTime.com, Inc., Chicago, IL (US)

(72) Inventor: Michael P. Caputo, Aurora, IL (US)

(73) Assignee: ShowingTime.com, Inc., Chicago, IL (US)

( * ) Notice: Subject to any disclaimer, the term of this patent is extended or adjusted under 35 U.S.C. 154(b) by 32 days.

(21) Appl. No.: 16/236,456

(22) Filed: Dec. 29, 2018

(51) Int. Cl.
*G06K 5/00* (2006.01)
*G06Q 50/16* (2012.01)
*G06K 7/14* (2006.01)
*H04W 84/12* (2009.01)

(52) U.S. Cl.
CPC .......... *G06Q 50/16* (2013.01); *G06K 7/1413* (2013.01); *G06K 7/1417* (2013.01); *H04W 84/12* (2013.01)

(58) Field of Classification Search
CPC ...... G06Q 50/16; G06K 7/1413; H04W 84/12
USPC .............................................. 235/382, 382.5
See application file for complete search history.

(56) References Cited

U.S. PATENT DOCUMENTS

| | | |
|---|---|---|
| 5,014,049 A | 5/1991 | Bosley |
| 5,245,652 A | 9/1993 | Larson et al. |
| 5,280,518 A | 1/1994 | Danler et al. |
| 5,475,375 A | 12/1995 | Barrett et al. |
| 5,612,683 A | 3/1997 | Trempala |
| 5,705,991 A | 1/1998 | Kniffin et al. |
| 5,974,406 A | 10/1999 | Bisdikian et al. |
| 6,101,480 A | 8/2000 | Conmy et al. |
| 6,157,315 A | 12/2000 | Kokubo et al. |
| 6,300,873 B1 | 10/2001 | Kucharczyk et al. |
| 6,385,541 B1 | 5/2002 | Blumberg |
| 6,496,776 B1 | 12/2002 | Blumberg |
| 6,522,875 B1 | 2/2003 | Dowling et al. |
| 6,594,633 B1 | 7/2003 | Broerman |
| 6,624,742 B1 | 9/2003 | Romano et al. |
| 6,636,803 B1 | 10/2003 | Hartz, Jr. et al. |
| 6,727,801 B1 | 4/2004 | Gervasi |
| 6,842,105 B1 | 1/2005 | Henderson |
| 6,973,432 B1 | 12/2005 | Woodard et al. |
| 7,009,489 B2 | 3/2006 | Fisher |

(Continued)

FOREIGN PATENT DOCUMENTS

WO 2017174526 10/2017

OTHER PUBLICATIONS

The KeyMe App, https://www.key.me/app.
MinuteKey, https://www.minutekey.com/.

*Primary Examiner* — Karl D Frech
(74) *Attorney, Agent, or Firm* — The Law Offices of Konrad Sherinian LLC (57) ABSTRACT

A doorbell cam device for controlling access to a listing includes a microprocessor, a video interface, an input interface, a wireless network interface, an audio interface and a special computer program. The doorbell cam device is adapted to scan a machine readable optical label encoding a showing appointment, request a showing appointment management system to validate the showing appointment, receive a validation result, and notify an electronic lock system to open when the showing appointment is validated. The opened electronic lock system provides access to the listing for a user presenting a showing pass scanned by the video interface. The scanning can be triggered by a double-press of the input interface.

6 Claims, 6 Drawing Sheets

(56) References Cited

U.S. PATENT DOCUMENTS

| | | |
|---|---|---|
| 7,058,395 B2 | 6/2006 | Dowling |
| 7,127,475 B2 | 10/2006 | Gotz |
| 7,191,058 B2 | 3/2007 | Laird et al. |
| 7,193,503 B2 | 3/2007 | Fisher |
| 7,292,844 B2 | 11/2007 | Dowling et al. |
| 7,518,485 B2 | 4/2009 | Shuster |
| 7,606,558 B2 | 10/2009 | Despain et al. |
| 7,664,801 B2 | 2/2010 | Walker |
| 7,728,711 B2 | 6/2010 | Shoenfeld |
| 7,853,479 B2 | 12/2010 | Bengson |
| 7,869,941 B2 | 1/2011 | Coughlin |
| 7,880,584 B2 | 2/2011 | Larson et al. |
| 7,999,656 B2 | 8/2011 | Fisher |
| 8,035,480 B2 | 10/2011 | Woodard et al. |
| RE43,068 E | 1/2012 | Woodard et al. |
| 8,145,352 B2 | 3/2012 | Woodard et al. |
| 8,368,507 B2 | 2/2013 | Conreux |
| 8,385,897 B1 | 2/2013 | Yadav-Ranjan |
| 8,451,088 B2 | 5/2013 | Fisher |
| 8,649,486 B1 | 2/2014 | Kellogg et al. |
| 8,754,744 B2 | 6/2014 | Woodard et al. |
| 8,831,970 B2 | 9/2014 | Weik, III |
| 8,947,530 B1 | 2/2015 | Scalisi |
| 8,971,506 B2 | 3/2015 | Kellogg et al. |
| 9,194,157 B2 | 11/2015 | Bahar |
| 9,208,466 B2 | 12/2015 | Fisher |
| 9,460,480 B2 | 10/2016 | Woodard et al. |
| 9,478,083 B2 | 10/2016 | Fisher |
| 9,536,359 B1 | 1/2017 | Gokcebay |
| 9,659,334 B2 | 5/2017 | Fenn |
| 9,659,424 B2 | 5/2017 | Huber et al. |
| 9,761,071 B2 | 9/2017 | Woodard et al. |
| 9,916,742 B2 | 3/2018 | Kuenzi |
| 9,978,192 B1 | 5/2018 | Nicosia et al. |
| 9,990,787 B2 | 6/2018 | Capaldi-Tallon |
| 10,026,248 B2 | 7/2018 | Woodard et al. |
| 10,044,519 B2 | 8/2018 | Kasmir et al. |
| 2002/0022980 A1 | 2/2002 | Mozayeny et al. |
| 2002/0174090 A1 | 11/2002 | Dexter |
| 2003/0038708 A1 | 2/2003 | Lund |
| 2003/0154573 A1 | 8/2003 | Gould |
| 2003/0179075 A1 | 9/2003 | Greenman |
| 2005/0149432 A1 | 7/2005 | Galey |
| 2005/0168320 A1 | 8/2005 | Henderson et al. |
| 2005/0192930 A1 | 9/2005 | Hightower et al. |
| 2005/0288958 A1 | 12/2005 | Eraker et al. |
| 2006/0106628 A1 | 5/2006 | Faherty et al. |
| 2006/0220809 A1 | 10/2006 | Stigall et al. |
| 2007/0100644 A1 | 5/2007 | Keillor |
| 2007/0143173 A1 | 6/2007 | Walker |
| 2007/0266081 A1 | 11/2007 | Murchison |
| 2007/0290798 A1 | 12/2007 | Larson et al. |
| 2008/0168369 A1 | 7/2008 | Tadman |
| 2008/0169937 A1 | 7/2008 | Lowry |
| 2011/0053557 A1 | 3/2011 | Despain et al. |
| 2012/0290203 A1 | 11/2012 | King |
| 2013/0005368 A1 | 1/2013 | Hunziker |
| 2013/0262186 A1 | 10/2013 | Lazarre |
| 2013/0282524 A1 | 10/2013 | Appolito et al. |
| 2014/0258042 A1 | 9/2014 | Butler |
| 2014/0304178 A1 | 10/2014 | Bengson |
| 2015/0077220 A1 | 3/2015 | Davis |
| 2015/0235145 A1 | 8/2015 | Dubuc |
| 2016/0180620 A1* | 6/2016 | Eyring ............... G07C 9/00031 235/382 |
| 2016/0241999 A1 | 8/2016 | Chin et al. |
| 2018/0075681 A1* | 3/2018 | Scalisi ................. H04L 67/125 |
| 2018/0232978 A1 | 8/2018 | Schmidt-Lackner |
| 2019/0244455 A1* | 8/2019 | Kim ..................... G06Q 10/083 |
| 2019/0327448 A1* | 10/2019 | Fu ....................... H04N 7/0806 |

* cited by examiner

FIG. 6

ELECTRONIC DEVICE FOR PROVIDING ACCESS TO PROPERTIES

CROSS-REFERENCE TO RELATED APPLICATIONS

None.

FIELD OF THE DISCLOSURE

The present invention relates generally to electronic devices for providing access to real estate properties, and more particularly relates to a front door electronic device for providing access to real estate properties based on showing appointments encoded in machine readable optical labels. More particularly still, the present disclosure relates to a doorbell cam device for controlling access to real estate properties based on showing appointments encoded in barcodes and validated via a showing appointment management system.

DESCRIPTION OF BACKGROUND

Mechanical locks and electronic locks are commonly used to control access to real estate properties. Some electronic locks, such as lockboxes, are capable of providing access for predetermined time periods. Certain electronic locks are also capable of control access to real estate properties based on one dimensional (1-D) barcodes and two dimensional (2-D) barcodes (also known as QR codes). As used herein, QR codes and three dimensional barcodes are also referred to as barcodes. Three dimensional (3-D) barcodes include a color dimension. The barcodes encode access data, such as access codes and allowed access time frame, and are scanned by the electronic locks. The electronic locks then authorize access to the real estate property, to which they are attached to, if the access data is authenticated.

The conventional real estate access control devices are not operatively coupled to real estate property showing appointment management system. A property showing appointment management system allows users (such as listing agents, showing agents, sellers, buyers, and others) to manage listings, managing listing agent profiles, manage showing agent profiles, schedule showing appointments, management showing appointments, communicate with others regarding real estate listings, collect and forward showing feedback, etc. The showing appointment management system can correctly authenticate accesses to properties without the risk of the access being compromised. Furthermore, the showing appointment management system maintains the up-to-date real estate data and assures the integrity of the data. Accordingly, there is a need for a system and method for control access to a real estate property via an electronic device attached to the property and the showing appointment management system.

Doorbells are widely used signaling devices for alerting persons inside real estate properties about the presence of visitors. A doorbell camera device (also referred to herein as a doorbell cam device) performs the functions of a conventional doorbell, and further incorporates a camera for providing video monitoring and surveillance capabilities. However, the conventional doorbell cam devices have never been operatively coupled to a showing appointment management system for managing showings and controlling access to the real estate property based on showing appointments. Therefore, there is a need for a new electronic device that reads showing data encoded in barcodes, communicates with the showing appointment management system to authenticate the showing data, and instructs an electronic lock to unlock itself after the showing data is authenticated.

OBJECTS OF THE DISCLOSED SYSTEM, METHOD, AND APPARATUS

Accordingly, it is an object of this disclosure to provide an improved doorbell cam device for controlling access to a real estate property.

Another object of this disclosure is to provide an improved doorbell cam device that scans a showing pass, communicates with a showing appointment management system to validate the showing pass and signals a lock system to unlock.

Another object of this disclosure is to provide an improved doorbell cam device that controls access to a listing by communicating with an electronic lock system over a Wi-Fi network.

Another object of this disclosure is to provide an improved doorbell cam device that controls access to a listing without requiring an electronic lock system storing a list of access codes.

Another object of this disclosure is to provide an improved doorbell cam device that controls access to a listing without requiring an electronic lock system storing a list of access codes encoded in one or more barcodes.

Another object of this disclosure is to provide an apparatus for providing access to a real estate property without using a Bluetooth® link.

Another object of this disclosure is to provide an improved doorbell cam device for providing access to a real estate property without using a Bluetooth® link.

Another object of this disclosure is to provide an apparatus for providing access to a real estate property without using a keypad.

Another object of this disclosure is to provide an improved doorbell cam device for providing access to a real estate property without using a keypad.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

Generally speaking, pursuant to the various embodiments, the present disclosure provides a new doorbell cam device. The new doorbell cam device includes a housing, a microprocessor disposed in the housing, an input interface operatively coupled to the microprocessor, a video interface operatively coupled to the microprocessor and adapted to scan machine readable optical labels, and a wireless network interface operatively coupled to the microprocessor. The wireless network interface is not a Bluetooth® interface. The new doorbell cam device further includes an audio interface operatively coupled to the microprocessor, and a specialized computer program running on the microprocessor. The specialized computer program is adapted to receive a user input via the input interface, determine that the user input is a scanning request for scanning a machine readable optical label, switch the video interface into a scanning mode to scan the machine readable optical label, receive the machine readable optical label encoding a showing appointment for showing a real estate property, and send a validation request to a showing appointment management system via the wireless network interface. The validation request indicates the showing appointment. In addition, specialized computer program is adapted to receive a validation result from the showing appointment management system, and where the validation result is positive, send an open command to an electronic locking system via the wireless network interface. In response to the open command, the electronic locking system unlocks itself. The user input indicates a double-press indicating the scanning request, and including a first press, a first release and a second press. The machine readable optical label is one of a one dimensional barcode, a two dimensional barcode, or a three dimensional barcode.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
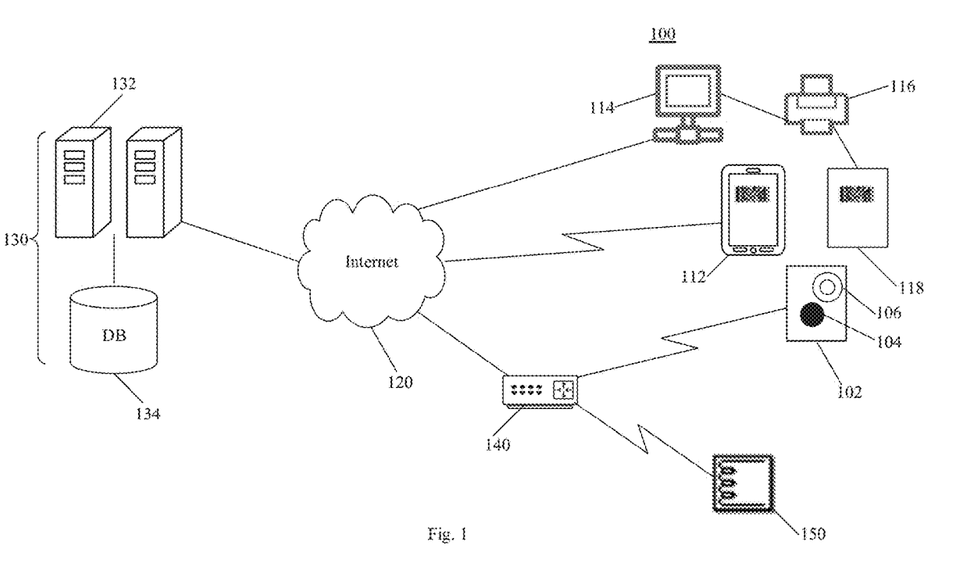
FIG. 1 is a simplified block diagram of a communication system providing user access to a real estate property based on a showing appointments in accordance with the teachings of this disclosure.

Turning to the Figures and to FIG. 1 in particular, a simplified block diagram of a communication system for managing access to real estate properties are shown and generally indicated at 100. The communication system 100 includes a showing appointment management system 130, a wireless router 140 (such as a Wi-Fi router) disposed inside a real estate property, an electronic locking system 150, a new doorbell cam device 102 having an input button 104 and a video camera 106, a mobile phone 112 operated by a user, a computer 114 operatively coupled to a printer 116 for printing a showing pass 118. The computer 114 (such as a laptop computer or a desktop computer), the mobile phone 112 (such as a smartphone), and the doorbell cam device 102 are adapted to communicate with the showing appointment management system 130 via the Internet 120. The system 130 includes one or more servers 132 and one or more databases 134 operatively coupled to the servers 132. The system 130 can be a standalone server system, a distributed server farm or a cloud-based server system and database system.

Figure 6:
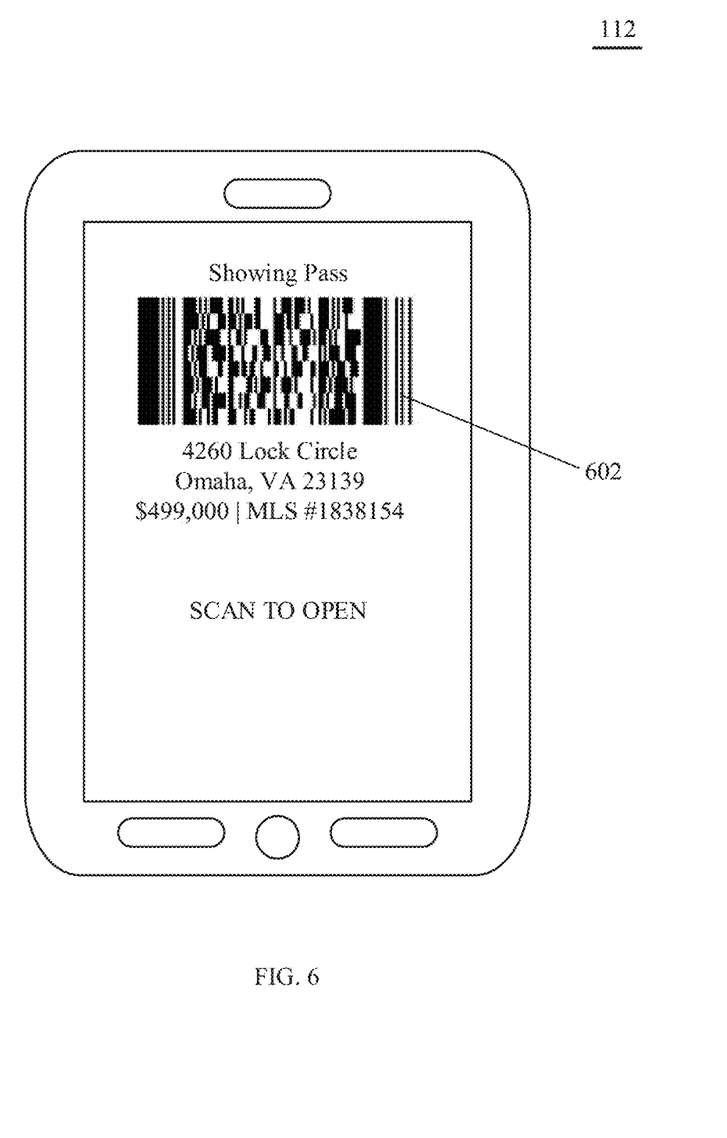
FIG. 6 is an illustrative mobile phone interface showing a showing pass in accordance with the teachings of this disclosure.

A user, such as a showing agent in the real estate industry, operates computer 114 to access the showing appointment management system 130 to schedule showing appointments for showing properties (also referred to herein as listings), provide showing feedback, and retrieve showing appointments in the form of showing passes. A showing pass indicates a showing appointment, and can be encoded into a machine readable optical label, such as a barcode. An illustrative showing pass displayed on the mobile phone 112 is shown in FIG. 6. The showing pass includes a machine readable optical label 602. The barcode 602 encodes showing appointment data, such as a showing appointment identifier (ID), a listing ID, a showing agent ID, a starting time of the showing appointment, and an ending time of the showing appointment. The barcode 602 may also encode a varied time window starting, for example, 30 minutes before the starting time of the showing appointment and ending 30 minutes after the ending time of the showing appointment.

A listing contact (such as a listing agent and the seller of a listing) can also use a computer to access the showing appointment management system 130 to manage listings, confirm showing appointments, and retrieve showing feedback. Such features can also be performed by mobile devices, such as a smartphones and tablet computers.

A showing agent can have the showing pass scanned by the new doorbell cam device 102 for gaining access to the underlying real estate listing. Alternatively, the showing agent uses the computer 114 to retrieve the showing pass, print it on paper 118 using the printer 116, and have the doorbell cam device 102 scan the printout 118 to gain access to the underlying real estate listing.

The doorbell cam device 102 is configured to communicate with the electronic locking system 150 (such as a lockbox) via the wireless router 140. When the electronic locking system 150 is locked, the property cannot be accessed. When it is unlocked, a showing agent can gain access to the property and step into the property.

Figure 2:
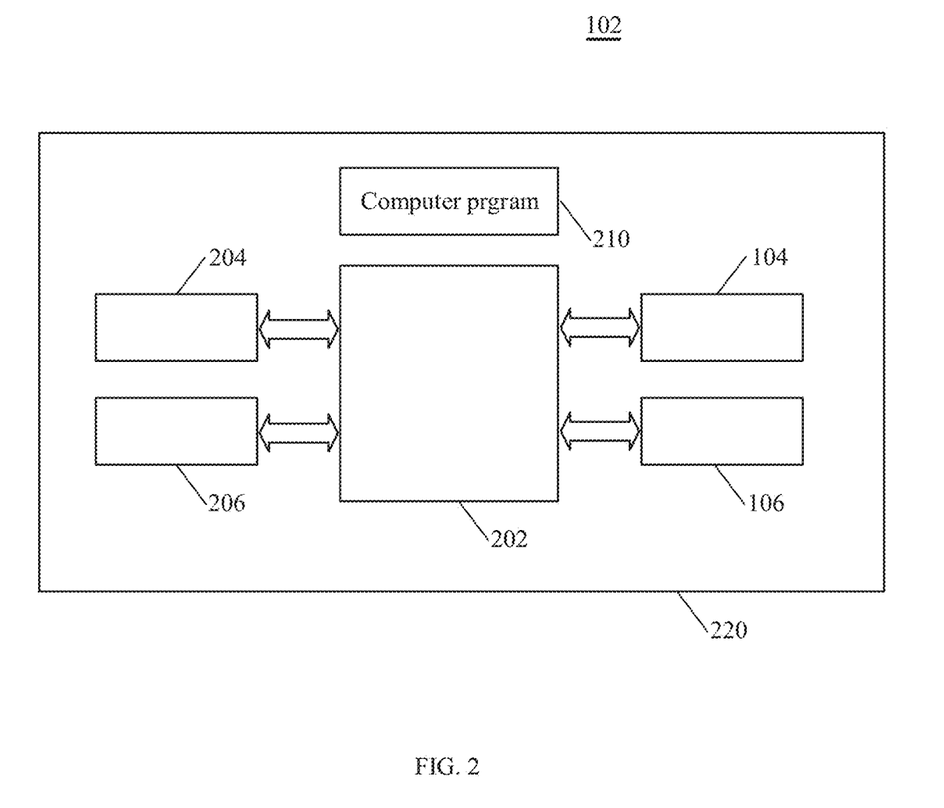
FIG. 2 is a simplified block diagram of a new doorbell cam device in accordance with the teachings of this disclosure.

The doorbell cam device 102 is further illustrated by reference to FIG. 2. The doorbell cam device 102 includes a processing unit 202 (such as a central processing unit), the input interface 104 operatively coupled to the microprocessor 202, the video interface 106 operatively coupled to the microprocessor 202, an audio interface 204 operatively coupled to the microprocessor 202, a wireless network interface 206 operatively coupled to the microprocessor 202, and one or more specialized computer programs 210 executed by the microprocessor 202. The doorbell cam device 102 further includes some amount of memory accessible by the microprocessor 202. The wireless network interface 206 allows the doorbell cam device 102 to communicate with the system 130 and the lock system 150 via the router 140. The video interface 106 includes a camera. The camera captures images within its view. The doorbell cam device 102 further includes a housing 220. The wireless network interface 206 and the microprocessor 202 are disposed within the housing 220.

In a different implementation, the camera is simply a reader (also referred hereto as scanner) for reading the machine readable optical label 602. In a further implementation, the doorbell cam device 102 includes both a camera and a scanner. Pressing the input button 104 causes the doorbell cam device 102 to trigger the sound interface 204 to generate an alarming sound to alert people inside the property or people remote from the property.

Figure 3:
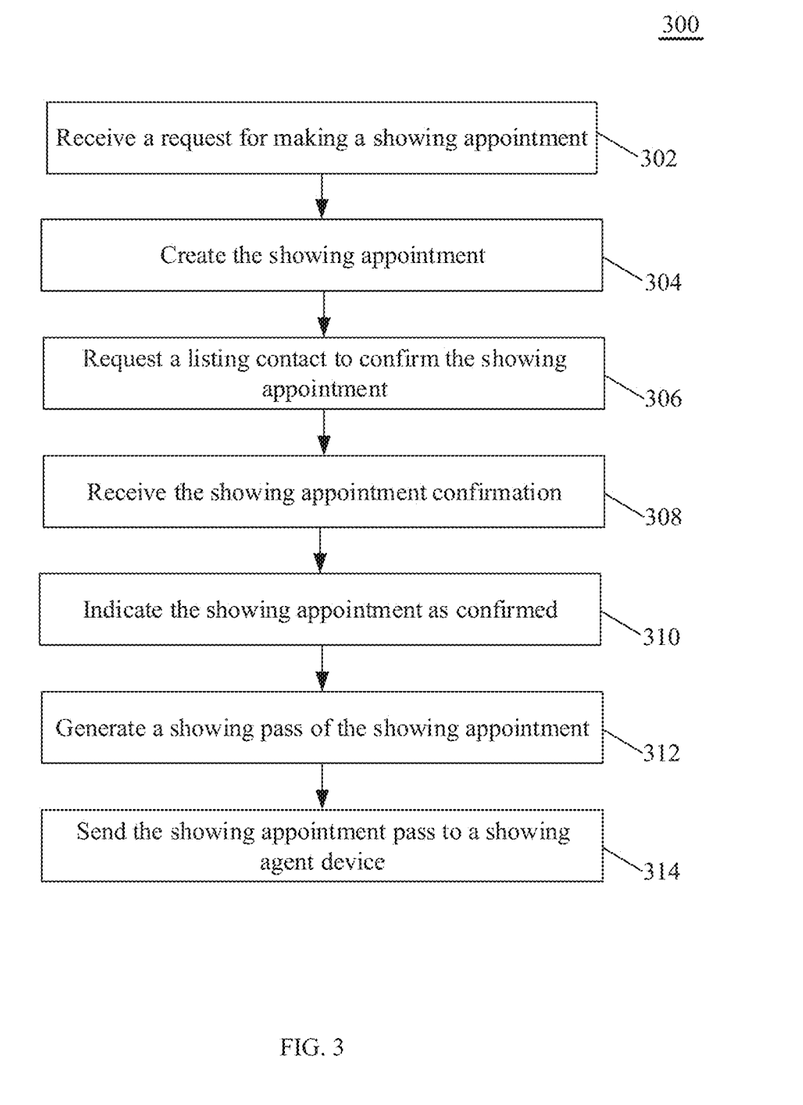
FIG. 3 is a flowchart depicting a process by which a real estate showing appointment management system manages showing appointments in accordance with the teachings of this disclosure.

Referring now to FIG. 3, a flowchart depicting a process by which the showing appointment management system 130 manages showing appointments is shown and generally indicated at 300. The showing appointment management system 130 runs one or more showing appointment management software applications to provide the requisite features.

At 302, the showing appointment management system 130 receives a request for making a showing appointment to show a particular listing. The showing appointment request can be made by a showing agent through the computer 114 or the mobile device 112. At 304, the showing appointment management system 130 creates the showing appointment, and stores it into the database 134. At 306, the showing appointment management system 130 sends a request to a listing contact (such as the listing agent) to confirm the showing appointment. Once the listing contact confirms the showing appointment, at 308, the showing appointment management system 130 receives the confirmation. At 310, the showing appointment management system 130 indicates that the showing appointment has been confirmed. The indication can be done by modifying database records stored in the database 134. At this point, the showing appointment has been successfully scheduled.

At 312, the showing appointment management system 130 generates a showing pass, such as the one shown in FIG. 6. The generation can be triggered automatically once the showing appointment is confirmed, or upon a request by the showing agent. At 314, the showing appointment management system 130 sends the showing pass to a showing agent device, such as the computer 114 or the mobile device 112. The computer 114 can retrieve the showing pass via E-mail, a web page or a local software application. The showing agent then can print out the showing pass via the printer 116. The printed showing pass is indicated at 118. The mobile device 112 can retrieve the showing pass via E-mail or a mobile app running on the mobile device 112.

When the showing agent goes to the property to show it for her/his prospect buyer client, she/he scans the showing pass using the new doorbell cam device 102. In one implementation, the showing agent makes a double-press of the button 104 to trigger scanning of the showing pass. The double-press of the button 104 occurs when two consecutive pressing of the button 104 is within a predefined time period, such as half second. The double-press switches the doorbell cam device 102 into a scanning mode. Other than a double-press, a press of the button 104 causes the doorbell cam device 102 to trigger the sound interface 204.

Figure 4:
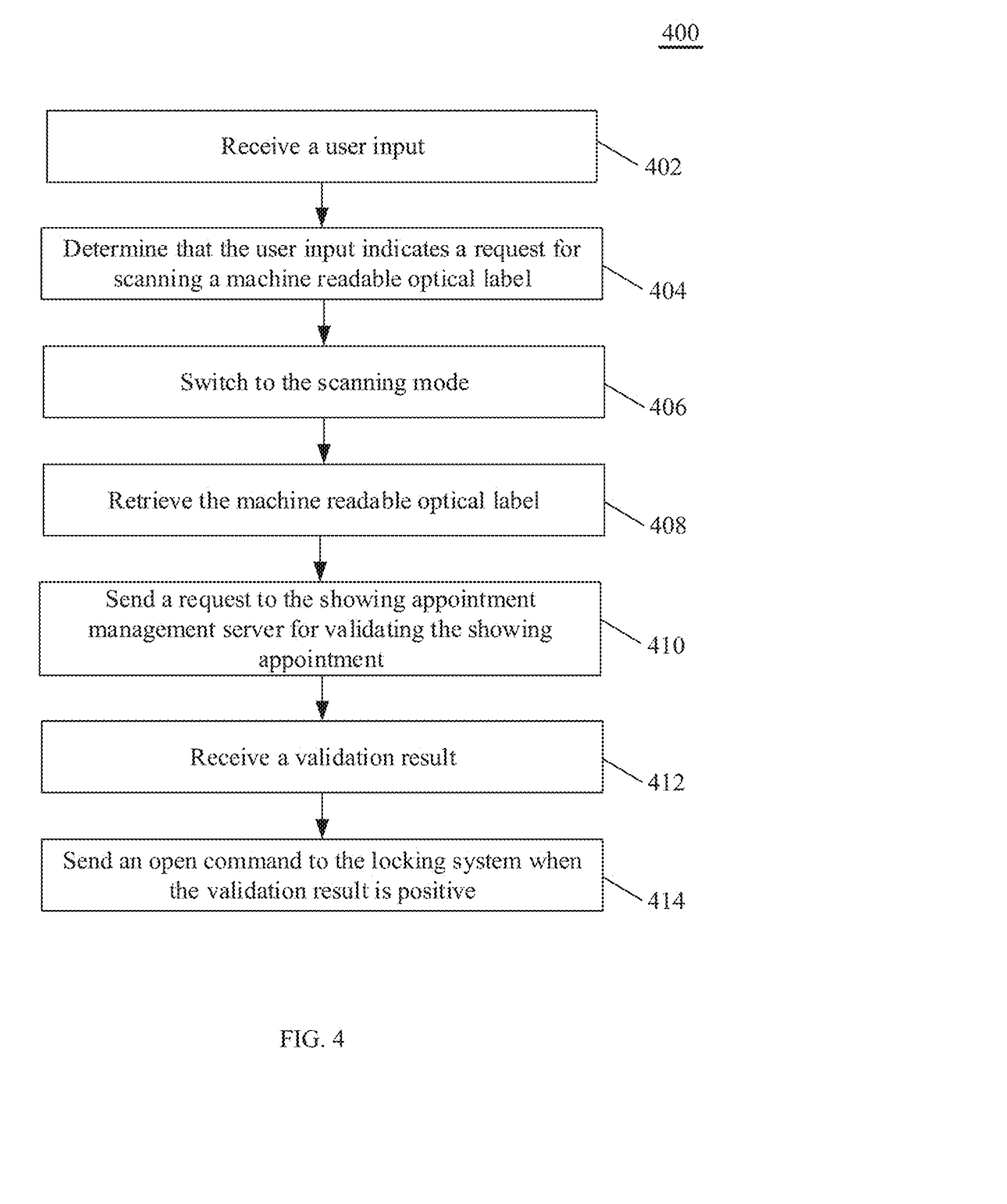
FIG. 4 is a flowchart depicting a process by which a new doorbell cam device control access to a real estate property based on a showing appointment in accordance with the teachings of this disclosure.

Referring to FIG. 4, a flowchart depicting a process by which the new doorbell cam device 102 controls access to the property is shown and generally indicated at 400. When the showing agent makes a double-press on the button 104, at 402, the computer program 210 retrieves the user input. The user input includes a first press of the button 104, the first release of it, and the second the press of the button 104. At 404, the computer program 210 determines that the user input indicates a double-press. It should be noted that the three input events, i.e., the first press, the first release and the second press, can be retrieved by the special computer program 210 at different points in time. Furthermore, the second press event triggers the determination that the double-press has been made. At 406, the computer program 210 switches the video interface 106 into a scanning mode. At 408, the doorbell cam device 102 scans the machine readable optical label (such as the showing pass 602), and the computer program 210 receives it. In addition, the computer program 210 decodes the showing pass 602 to extract the showing appointment data encoded therein. At 410, the computer program 210 sends a showing appointment validation request to the showing appointment management system 130 to validate the showing appointment encoded in the showing pass 602. In response, the showing appointment management system determines whether the showing appointment is valid, and responds with a validation result.

At 412, the computer program 210 receives the result. When the showing appointment is positively validated, at 414, the computer program 210 sends a command to the electronic locking system 150 over the wireless network interface 206. The doorbell cam device 102 does not communicate with the electronic locking system 150 over short range connection technologies, such as Bluetooth®. The command instructs the electronic locking system 150 to unlock itself. The electronic locking system 150 does not have to store any barcode encoding access codes to the property.

Figure 5:
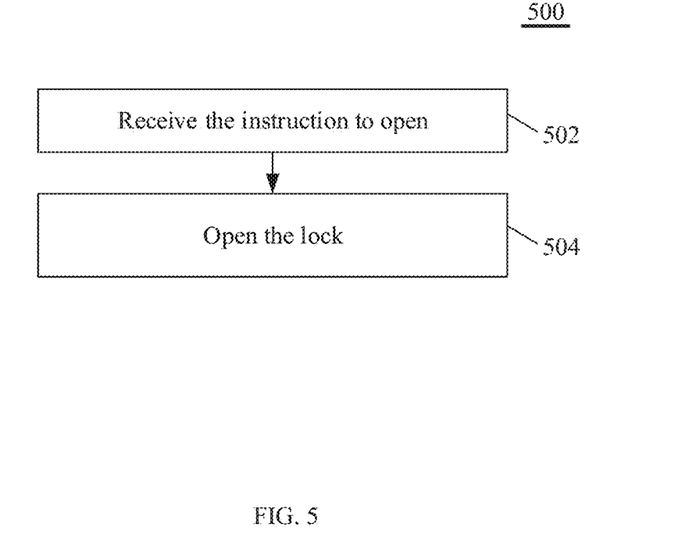
FIG. 5 is a flowchart depicting a process by which an electronic locking system communicates with a new doorbell cam device and controls access to a real estate property in accordance with the teachings of this disclosure.

Turning to FIG. 5, a flowchart depicting a process by which the electronic locking system 150 controls the access to the property is shown and generally indicated at 500. At 502, the electronic locking system 150 receives the open command from the new doorbell cam device 102. At 504, the electronic locking system 150 unlocks itself.

In a different implementation, the video interface 106 is a dedicated scanner for reading machine readable optical labels. In such a case, the elements 402, 404 and 408 are no longer performed. Furthermore, the showing agent does not press the button 104, but directly scans the showing pass 602 by the scanner 106. In yet another implementation, the special computer program 210 examines each image captured by the video interface 106, and determines whether it is a showing pass or not. If so, it then performs the elements 410-414.

Obviously, many additional modifications and variations of the present disclosure are possible in light of the above teachings. Thus, it is to be understood that, within the scope of the appended claims, the disclosure may be practiced otherwise than is specifically described above. For example, the doorbell cam device 102 communicates with the showing appointment management system 130 via a wide area cellular network, such as a 3G, 4G or 5G network. As another example, the doorbell cam device 102 incorporates a motion sensor. The motion sensor automatically triggers the scanning of the showing pass 602 or the showing pass 118 when presented in front of the video interface 106. As used herein, the detected presence by the motion sensor is also referred as a user input.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A doorbell cam device comprising:
   i. a housing;
   ii. a microprocessor disposed within said housing;
   iii. a user input interface operatively coupled to said microprocessor;
   iv. a video interface operatively coupled to said microprocessor and adapted to read machine readable optical labels;
   v. a wireless network interface operatively coupled to said microprocessor and disposed within said housing, wherein said wireless network interface is not a Bluetooth® interface;
   vi. an audio interface operatively coupled to said microprocessor and adapted to generate an alarming sound when a first user input is received via said user input interface; and
   vii. a specialized computer program running on said microprocessor, said specialized computer program adapted to:
      1) receive a second user input via said user input interface;
      2) determine that said second user input indicates a scanning request for scanning a machine readable optical label;
      3) switch said video interface into a scanning mode to scan said machine readable optical label when said second user input indicates said scanning request;
      4) receive said machine readable optical label encoding a showing appointment for showing a real estate property, said machine readable optical label scanned in by said video interface;
      5) send a validation request to a showing appointment management system via said wireless network interface, said validation request indicating said showing appointment, said showing appointment management system adapted to manage real estate property showings and accessible via the Internet;
      6) receive a validation result from said showing appointment management system via said wireless network interface; and
      7) where said validation result is positive, send an open command to an electronic locking system via said wireless network interface, wherein said electronic locking system, in response to said open command, unlocks itself.

2. The doorbell cam device of claim 1 wherein said first user input indicates a single press and said user input indicates a double-press, wherein:
   i. said double-press indicates said scanning request; and
   ii. said user input includes a first press, a first release and a second press.

3. The doorbell cam device of claim 1 wherein said second user input is detected by a motion sensor of said doorbell cam device.

4. The doorbell cam device of claim 1 wherein said machine readable optical label is one of:
   i. a one dimensional barcode;
   ii. a two dimensional barcode; or
   iii. a three dimensional barcode.

5. A doorbell cam device comprising:
   i. a housing;
   ii. a microprocessor disposed in said housing;
   iii. an input interface operatively coupled to said microprocessor;
   iv. a video interface operatively coupled to said microprocessor and adapted to read machine readable optical labels;
   v. a wireless network interface operatively coupled to said microprocessor, disposed in said housing, wherein said wireless network interface is not a Bluetooth® interface;
   vi. an audio interface operatively coupled to said microprocessor; and
   vii. a specialized computer program running on said microprocessor, said specialized computer program adapted to:
      1) receive a machine readable optical label encoding a showing appointment for showing a real estate property, said machine readable optical label scanned by said video interface;
      2) send a validation request to a showing appointment management system via said wireless network interface, said validation request indicating said showing appointment, said showing appointment management system adapted to manage real estate property showings and accessible via the Internet;
      3) receive a validation result from said showing appointment management system via said wireless network interface; and
      4) where said validation result is positive, send an open command to an electronic locking system via said wireless network interface, wherein said electronic locking system, in response to said open command, unlocks itself.

6. The doorbell cam device of claim 5 wherein said machine readable optical label is one of:
   i. a one dimensional barcode;
   ii. a two dimensional barcode; or
   iii. a three dimensional barcode.

* * * * *